United States Patent [19]

Shuman

[11] Patent Number: 4,592,946

[45] **Date of Patent: * Jun. 3, 1986**

[54] THERMAL INK TRANSFER RECORDING

[75] Inventor: Ralph J. Shuman, Needham, Mass.

[73] Assignee: Dennison Manufacturing Company, Framingham, Mass.

[ * ] Notice: The portion of the term of this patent subsequent to Apr. 9, 2002 has been disclaimed.

[21] Appl. No.: 657,903

[22] Filed: Oct. 5, 1984

Related U.S. Application Data

[63] Continuation-in-part of Ser. No. 525,188, Aug. 22, 1983, Pat. No. 4,510,206.

[51] Int. Cl.[4] .......... B32B 5/16; B32B 7/06

[52] U.S. Cl. .......... 428/200; 427/148; 428/202; 428/211; 428/488.1; 428/488.4; 428/913; 428/914; 430/348

[58] Field of Search .......... 428/488.1, 337, 348, 428/485, 488.4, 913, 914, 195, 200, 202, 211; 427/148; 430/348

[56] References Cited

U.S. PATENT DOCUMENTS

| | | | |
|---|---|---|---|
| 3,616,015 | 10/1971 | Kingston | 428/485 X |
| 3,871,065 | 3/1975 | Iomiyama et al. | 427/148 X |
| 3,983,279 | 9/1976 | Matsushita et al. | 428/101 |
| 4,004,065 | 1/1977 | Matsushita et al. | 430/348 X |
| 4,269,892 | 5/1981 | Shattuck et al. | 428/337 |
| 4,271,223 | 6/1981 | Lambert et al. | 428/337 X |
| 4,510,206 | 4/1985 | Shuman | 428/488.1 |

*Primary Examiner*—Thomas J. Herbert
*Attorney, Agent, or Firm*—Barry D. Josephs

[57] ABSTRACT

A thermal ink transfer laminate wherein an ink design is transferred from a carrier support to an article, typically paper, by application of a thermal printing element, e.g. of the dot matrix type, to the nontransfer side of the carrier. The thermal ink transfer laminate is composed of a carrier support of paper or plastic film overcoated on one side with a heat sensitive transfer substrate. The heat sensitive transfer substrate contains an ink which preferably includes a coloring agent formed of a dye dispersed in an unsaturated fatty acid medium. A separate release layer may be included between the ink and carrier. The coloring agent facilitates attainment of a drastic drop in melt viscosity of the transfer laminate during thermal transfer onto a receiving article. The degree of transfer attained is virtually complete resulting in a transferred image of exceedingly high image clarity and definition when employing the thermal printing element. The heat sensitive coating permeates fibrous receiving articles during thermal transfer resulting in a nonraised, firmly anchored abrasion-resistant transferred image.

20 Claims, 3 Drawing Figures

THERMAL INK TRANSFER RECORDING

This application is a continuation-in-part of patent application Ser. No. 525,188 filed Aug. 22, 1983 subsequently issued as U.S. Pat. No. 4,510,206.

BACKGROUND OF THE INVENTION

I. Field of the Invention

The present invention relates to a thermal ink transfer laminate for transfer of an image from the laminate onto a receiving article.

II. Description of the Prior Art

Prior art thermal ink laminates consist typically of a support substrate of paper or plastic film coated with a heat sensitive ink coating which melts upon application of heat from a thermal printing element in contact with a side of the laminate opposite the coating. Upon melting, the ink becomes transferable onto a receiving article, thus forming transferred images on the receiving article. One form of related art is known as thermal paper. Thermal paper consists of a support substrate or plastic film coated with a heat sensitive ink coating. In thermal paper, local heat is applied directly to the coated surface, for example, by use of a thermal printing element in direct contact with the coating. The components in the ink coating react along the point of contact with the print element thereby forming images directly on the carrrier substrate itself. Although a heat sensitive ink coating is used in thermal paper, the image forms directly on the paper without being transferable onto another article. In contrast, applicant's invention is directed to thermal ink transfer laminates wherein images are transferred from the laminate to a receiving article. In applicant's product, unlike thermal paper, the images are formed on the transferable coating by localized heating from a thermal print element in contact with a side of the laminate opposite the coating, and the formed images are transferred onto a receiving article in contact with the coating.

Another related art is known as resistive-type ink transfer laminate formed of a heat sensitive ink coating on an electrically conductive support substrate, typically electrically conductive paper or plastic film. In the resistive-type laminate, the support substrate is electrically conductive so that as an electrical print element of two electrodes is applied to the side of the laminate opposite the ink coating, a current passes along the carrier surface between the electrodes. The passage of current results in localized heating which causes the ink coating to melt, thus forming images which are transferable onto a receiving article. In contrast, the thermal ink transfer laminate of the type of the present invention is not electrically conductive, but rather the support substrate need only be sufficiently thermally conductive to permit heat generated by a thermal print element to pass through the substrate and melt the heat sensitive ink coating on the opposite side.

U.S. Pat. No. 4,269,892 is illustrative of resistive types of ink transfer laminates wherein the substrate is electrically conductive. In this reference the substrate is a ribbon, typically of polyester, which contains dispersed therein electrically conductive particles of carbon black. The ribbon is overcoated with the thermal transfer ink layer which comprises a wax or a thermoplastic resin, carbon black pigment, and optionally a dye. As electrodes are applied to the side of the ribbon opposite the transfer ink layer, passage of current between the electrodes produces intense local heating along the contact points which causes transfer of ink to a receiving article. Since the ink transfer laminate disclosed in this reference is of the resistive type it does not bear on applicant's products which employ a nonelectrical conductive support substrate.

U.S. Pat. No. 3,871,065 is illustrative of thermal paper. In this reference, thermal paper is disclosed which is composed of a substrate, typically a paper sheet coated on one side with a heat sensitive ink coating. As a heated print element, for example a thermal printhead typically composed of heated dot matrices, is applied to the clean side of the substrate, the heat sensitive ink coating melts forming images directly on the coating. The invention described in this reference is directed to an improved heat sensitive ink coating. The ink sensitive coating described therein is of the reactive type, which is typically employed in thermal paper. In such reactive-type coatings there are two or more reactive color-forming components which react upon exposure to heat, thereby producing a color of high optical density. In addition to the reactive color-forming components, the ink formulation disclosed in this reference includes a binder, solvents, and an inhibitor which prevents reaction of the color-forming components prior to application of heat. One of the reactive color-forming components contains an iron salt of an aliphatic acid and the other contains a compound selected from the class of gallic acids and its derivatives. The invention is directed to an improvement in the heat sensitive ink coating layer, which improvement eliminates exfoliation by selection of a binder selected from the group of methyl cellulose and acetylcellulose having a melting point of not lower than about 180° C. The ink coating formulation disclosed in this reference, which applies to thermal paper, does not bear on applicant's heat sensitive ink formulation since applicant does not employ reactive color-forming components or solvents.

U.S. Pat. No. 4,004,065 discloses a thermal paper having a heat sensitive ink layer of similar type to that disclosed in U.S. Pat. No. 3,871,065. The heat sensitive layer is an ink formulation composed of two reactive color-forming components, a binder, solvents, and an inhibitor. The color-forming components are composed of an iron salt of a higher fatty acid and gallic acid, which components react with each other to form a color upon exposure to heat. In addition to the color-forming agents, there is dispersed in the binder a stilbene series fluorescent dye, which inhibits the color-forming reaction prior to heat exposure. The binder is composed of at least one component selected from the group of hydroxypropyl cellulose and hydroxypropyl methyl cellulose. The heat sensitive ink formulation disclosed in this reference does not apply to applicant's formulation since applicant's formulation does not include reactive color-forming components. Furthermore, the images formed on the thermal paper are not transferable to a receiving article as in the case of applicant's invention.

U.S. Pat. No. 3,983,279 discloses a thermal paper of the above-type. However, the thermal paper described in this latter reference is composed of a support substrate, typically of paper which is coated on both sides with a heat sensitive color-forming layer. One of the heat sensitive layers (12) is nontransferable, and the other heat sensitive layer (13) is transferable onto a receiving article as illustrated in FIG. 3 upon application of heat to the substrate. Heat sensitive layer 13 is relevant to thermal ink transfer laminates, the subject of applicant's invention, only to the extent that it is a heat sensitive layer which transfers onto a receiving article upon application of heat to the support substrate. However, both heat sensitive layers disclosed in this reference, including the heat sensitive transfer layer 13 contain color-forming components which react with one another to produce color upon exposure to heat. In addition to the reactive color-forming components, the heat sensitive transfer layer 13 includes a binder of wax and resin, a plasticizer, and a solvent. The heat sensitive transfer layer does not bear on applicant's formulation, since applicant does not employ reactive color-forming components, and furthermore applicant's coating is a hot melt mix, that is, does not include a solvent.

A high speed thermal ink transfer recording substrate is disclosed in the publication, T. Ohno, M. Mizuguchi et al., "High Speed Thermal Ink Transfer Recording and Its Application", *Journal of Applied Photographic Engineering,* Vol. 7, pp. 171–174 (Dec. 1981). In this publication, a thermal ink transfer laminate is disclosed as composed of a thin support substrate of condenser paper or polyester film coated with a heat sensitive ink transfer coating. Upon contacting the substrate with a thermal printhead, typically a heated element having a dot matrix density of about 6×6 dots per square millimeter, the ink coating melts and forms an image which transfers onto a receiving article such as paper or plastic receptor. This publication discloses use of a condenser paper of 12 micrometer thickness having coated thereon a heat sensitive ink of basis weight of about 4 grams per sq. meter. The disclosed ink formulation is composed of a coloring pigment in a binder containing both a wax base and a resin. The publication indicates that the wax component enhances the adhesion and transferability of the ink coating, whereas the resin component enhances the durability of hardness of the transferred print image. The publication reports that high speed printing at speeds of less than 3 milliseconds per element pulse duration is best achieved if ink coatings having a melting point of about 65° C. to 70° C. are employed where the viscosity is low, on the order of 200 cps or lower at a temperature of about 90° C. Physical properties of a preferred heat sensitive ink formulation are presented in Table I of the publication. The ink referenced therein has a melting point of about 76° C., a melt viscosity of about 80 cps, and a coating weight of about 4 grams per sq. meter. The ink coating is transferred at an input printhead power of 0.7 watts, pulse duration as low as 1.5 milliseconds per element. There is no disclosure of the chemical nature of the resin or wax binder, or coloring agent, or any other additive in the ink formulation to produce a heat sensitive ink coating. Furthermore, there is no teaching of employing a coloring agent to control viscosity. One disadvantage with prior art thermal ink transfer substrates of the type disclosed in this publication is that the image does not transfer completely onto a receiving article, i.e. visible particles of ink are apt to be left behind on the support substrate in the regions of transfer. This can result in inconsistent or impaired image definition.

U.S. Pat. No. 3,616,015 is illustrative of heat transferable labels which are formed of a carrier support overcoated with a wax-based release layer and an ink layer thereon. Heat transferable labels of this type having formulations disclosed in this reference cannot be utilized with an electrically activated thermal print head of the dot matrix type. Instead it should be apparent from the reading of the reference as a whole that heat transferable labels are designed to transfer completely in large areas covered by the entire label itself rather than in tiny discrete dots which conform to the size and shape of corresponding heated dot elements of an activated thermal printhead. The heat transferable laminate disclosed in the '015 reference utilized heated platen rollers rather than a dot matrix type print head to effect transfer of the entire laminate from the carrier support. Additionally, heat transferable laminates of the type disclosed in this reference have release layers which melt at higher temperatures in order to accommodate transfer by rolling pressure from a heated surface at a temperature between about 250° to 600° F., for example 350° F. (See column 3, lines 35 to 40.) The class of thermally activated ink transferable laminates of the type with which applicant's invention is directed thus must effect transfer by action of an electrically activated thermal print head, e.g. of the dot matrix type, which subject the transfer layer to much lower temperatures than the heated platen or roller. It should be evident that applicant's transfer laminate has transfer requirements with different objectives and conditions to satisfy than those disclosed in this reference. Consequently the formulations disclosed in this reference would not be workable in accomplishing applicant's objectives.

Accordingly, it is a principal object of the present invention to provide a thermal ink transfer laminate exhibiting improved image definition upon transfer of the formed images from the transfer laminate to a receiving article.

It is an important object that the formed images exhibit improved release characteristics permitting improved, complete transfer of the formed images from the transfer laminate to a receiving article.

It is another important object of the present invention to provide a thermal ink transfer laminate wherein the transferred images exhibit improved adhesion to the receiving article.

SUMMARY OF THE INVENTION

In accomplishing the foregoing and related objects, in one aspect of the invention a thermal ink transfer laminate is provided having a carrier support of paper or plastic film overcoated on one side with a heat sensitive ink coating. A preferred carrier is a very thin paper of about 0.5 mil or less and having a high smoothness of about 0 to 3 on the Sheffield scale of 0 to 100. In this embodiment, the heat sensitive coating is composed of a hot melt ink mix containing a coloring agent, a wax binder, and a resin binder. The ink mix exhibits a viscosity of between about 150 to 900 centipoise, preferably b 150 to 500 centipoise as measured at 225° F. The viscosity of the ink mix may advantageously be between about 250 to 500 centipoise at 225° F. The ink mix has a drop melting point between about 130° F. to 225° F., preferably about 130° F. and 170° F.

The coloring agent is composed of a dye dispersed in a monounsaturated or polyunsaturated fatty acid having a carbon content between about $C_{10}$ to $C_{20}$. The preferred mono or polyunsaturated fatty acid has a carbon content desirably between about $C_{15}$ to $C_{18}$. The preferred monounsaturated fatty acids for the coloring agent are cis isomers of $C_{15}$ to $C_{18}$ monounsaturated fatty acids, and in particular oleic acid. Preferred polyunsaturated acids are linoleic or linolenic acids. The dye may be selected from a wide array of conventional black or colored dye pigments. A black dye may be desirably selected from nigrosine, methyl violet, or induline dyes. A preferred black dye, however, is a nigrosine dye. Carbon black is advantageously included in the coloring agent along with the black dye. The wax binder component is principally composed of a paraffin wax. Carnauba wax is advantageously included in the wax binder. The paraffin wax is composed of linear saturated hydrocarbons preferably having a melting point between 110° F. and 175° F. The wax binder preferably also includes microcrystalline wax. The paraffin wax together with the coloring agent has been determined to give the ink coating its principal fluidity and release characteristics upon melting. The resin binder is preferably a copolymer of ethylene and vinylacetate and is added to the mix principally to increase the durability and abrasion resistence of the transferred image. Another preferred resin binder is composed of polyethylene granules.

The hot melt ink mix formulation for the heat sensitive coating exhibits a wide array of physical properties simultaneously and most importantly permits the complete transfer of the image to the receiving article upon contact of a thermal print element to the carrier. The degree of transfer is so complete that virtually no ink particles are visible to the unaided eye on the coated side of the carrier support in regions on the carrier where transfer has been effected. The result is attainment of a transferred image of sharper image definition and higher, optical density than heretofore possible.

It is not known with certainty all the variables responsible for attainment of so complete a transfer of the image from the carrier support. It has been determined, however, that a significant factor is a result of inclusion of the unsaturated fatty acid-based coloring agent. The unsaturated fatty acid-based coloring agent as above-defined in addition to being a suitable colorant base, per se, has been determined to cause a drastic drop in melt viscosity of the heat sensitive coating upon transfer. It has been determined, surprisingly, that inclusion of the unsaturated fatty acid-based coloring agent preferably in an amount of between about 5 to 40 percent by weight, typically about 10 percent by weight of the ink mix formulation, reduces viscosity of the mix from about 1,200 centipoise to about 400 centipoise at a temperature of about 25° F. above the melting point of the mix. This sharp reduction of melt viscosity in combination with contributing release and plastic properties of the wax binder, in particular in combination with the paraffin wax component, has resulted in virtually complete transfer of the print image onto a receiving article.

In addition to improving the release characteristics of the image during transfer, the coloring agent herein has simultaneously exhibited another unexpected property. Namely, the coloring agent has been determined to significantly improve permeation of the transferred image into the surface of a fibrous, e.g. paper, receiving article. Enhanced permeation results in improved anchorage, i.e. improved adhesion of the transferred image on the surface of a paper-receiving article. Increased permeation also results in a transferred image which is not raised but rather is level with the surface of the receiving paper. Thus, the transferred image being strongly anchored to and level with the receiving surface will withstand rubbing or handling far better than any prior art thermal ink.

The ink mix formulation as a whole thus satisfies a number of requirements simultaneously. It is easily and uniformly coatable on the carrier support at low coating weights. It exhibits sufficiently high bonding strength to the carrier but yet has very high release characteristics upon melting to permit complete transfer to a receiving surface. The transferred ink herein adheres permanently to the receiving article and is abrasion-resistent. The transferred image is of high reflective optical density and more sharply defined than heretofore possible.

In another aspect of the invention the carrier support is coated with a heat sensitive transfer substrate which contains two distinct layers, a release layer and a transfer ink coating. The release layer is in contact with the carrier support. The transfer ink coating is applied over the release layer. The heat sensitive transfer substrate transfers to a receiving article in contact therewith along points at which an electrically activated thermal printhead is applied to the exposed surface of the carrier support. The carrier support may be of paper or plastic film and the preferred carrier is very thin paper of about 0.5 mil or less and having a smoothness of about 0 to 3 on the Sheffield scale of 0 to 100. The release coating is a wax base release composed of a wax binder and resin binder. The wax binder is preferably composed of a paraffin wax, a microcrystalline wax, and a carnauba wax. The resin binder is preferably ethylene vinyl acetate copolymer. The transfer ink coating is formed of a coloring agent, a resin binder and may advantageously include a plasticizer oil and solvent. In this embodiment, the wax component is thus excluded from the transfer ink coating. The release layer has a drop melting point between about 130° F. to 225° F., preferably about 130° F. and 170° F. The heat sensitive transfer substrate has the property that the viscosity as measured by the totality of components contained in both the release layer and transfer ink coating has a viscosity of between about 150 to 900 centipoise, preferably 150 to 500 centipoise as measured at 225° F. The viscosity of the totality of components contained in the release layer and transfer coating advantageously has a viscosity between about 250 to 500 centipoise at 225° F. The coloring agent included in the transfer ink coating is preferably composed of a dye dispersed in a monounsaturated or polyunsaturated fatty acid having a carbon content between about $C_{10}$ to $C_{20}$. The preferred mono or polyunsaturated fatty acid has a carbon content desirably between about $C_{15}$ to $C_{18}$. The preferred monounsaturated fatty acid for the coloring agent are cis isomers of $C_{15}$ to $C_{18}$ monounsaturated fatty acids, and in particular oleic acid. Preferred polyunsaturated fatty acids are linoleic or linolenic acids. The dye may be selected from a wide variety of conventional black or color dye pigments. A black dye may be desirably selected from Nigrosine, methyl-violet or induline dyes. A preferred black dye is a Nigrosine dye. Carbon black is advantageously included with the coloring agent along with the black dye. The resin binder included in the transfer ink coating is preferably a polyterpene hydrocarbon resin. The transfer ink coating in this embodiment advantageously includes a plasticizer oil such as octyltallate solvent. After the transfer ink coating is applied over the release layer, the solvent is evaporated from the coating by exposing the coating to the convective drying.

The wax binder component in the release layer is principally composed of a paraffin wax. The paraffin wax is composed of linear saturated hydrocarbons preferably having a melting point between 110° F. and 175° F. The wax binder preferably also includes a microcrystalline wax as well as a carnauba wax. A resin binder, preferably a copolymer of ethylene and vinyl acetate, is advantageously added to the release formulation principally to increase the durability and abrasion resistance of this coating as it forms a protective coating over the ink layer upon transfer to a receiving article.

This embodiment of the invention permits complete transfer of the image to a receiving article upon contact of a thermal print element, e.g. an electrically-activated thermal print head of the dot matrix type. The degree of transfer is so complete that virtually no ink particles are visible to the unaided eye on the coated side of the carrier support in regions along the carrier where transfer has been effected. Similarly, the degree of transfer of the release is virtually complete so that essentially little if any release composition is left behind on the carrier in the regions of transfer. The transferred release forms a uniform protective coating over the ink layer upon trasfer to a receiving article. The result is attainment of a transferred image of sharper image definition and higher, optical density than heretofore possible when employing an electrically-activated thermal print head.

It is not known with certainty all variables responsible for attainment of so complete a transfer of the image from the carrier support upon application of the electrically-activated thermal print head. The release layer formulated to melt within the aforesaid melting point range permits release of the heat transfer substrate upon contact of an activated thermal print head to the exposed side of the carrier.

It is theorized that the inclusion of an unsaturated fatty acid based coloring agent within the transfer ink coating contributes significantly to attainment of improved transfer and sharper image definition as well as higher optical density of the transfer image. The unsaturated fatty acid based coloring agent as above defined in addition to being suitable colorant base, per se, has been determined to cause a drastic drop in viscosity of the totality of components within the heat sensitive transfer layer during transfer. For example, it has been determined that inclusion of the unsaturated fatty acid based coloring agent preferably in an amount between about 5 to 40 percent by weight, typically about 10 percent by weight of the total combined composition of release layer and ink transfer layer, reduces viscosity of the mixture from about 1200 centipoise to about 250 centipoise at a temperature of about 25° F. above the melting point of the mix. The sharp reduction of melt viscosity in combination with contributing release properties of the separate release layers has resulted in virtual complete transfer of print image onto receiving articles. Additionally, inclusion of the unsaturated fatty acid based coloring agent permits easier coatability of the ink formulation over the release coating by use of conventional gravure techniques. The use of separate release layers as in this embodiment makes it easier to employ a multicolored transfer ink layer. A multicolored transfer ink layer of any color pattern may be formed by use of separate gravure stations, each one of which would apply a different color ink in the desired pattern. Use of a separate release coating also forms a highly scuff and abrasion resistant protective coating over the ink layer after transfer to the receiving article.

DETAILED DESCRIPTION

Figure 1:
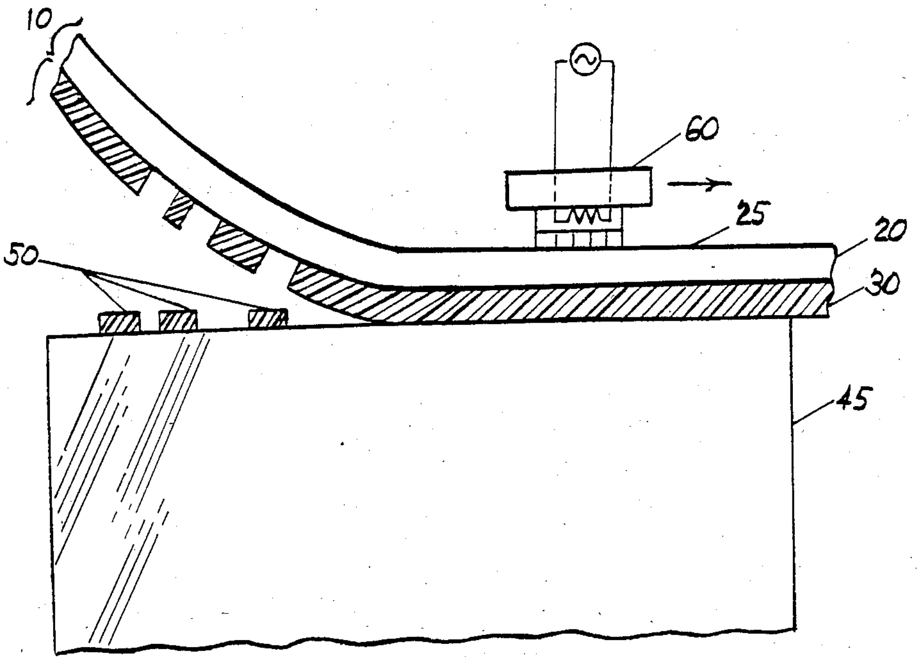
FIG. 1 is an illustration of a preferred embodiment of the composite thermal ink transfer laminate and application to a receiving article.

The preferred embodiment of the thermal ink transfer laminate 10 of the invention as illustrated in FIG. 1 is composed of a thermally conductive carrier support 20, typically of paper or plastic film overcoated on at least one side with a heat sensitive transfer ink coating 30. A thermal print head 60 typically electrically activated comes into contact with an exposed surface 25 on the side of substrate 20 opposite coating 30. The electrically-activated thermal print head 60 is preferably of the dot matrix type as referenced generally in Ohno, *Journal of Applied Photographic Engineering*, Vol. 7, pp 171–174 (Dec. 1981) herein incorporated by reference. Print head 60 is typically composed of a matrix of compactly spaced tiny metal probes 65 (dot elements under 1/16 inch in diameter) which are electrically activated. As individual dot elements become activated they become hot instantly. The heat generated by the print head at the point of concact with substrate 20 causes the underlying region of the heat sensitive ink layer 30 to instantly melt at the point of contact. A receiving article 45, typically a paper or plastic substrate, is pressed in intimate contact with the heat sensitive transfer ink layer 30 during the printing action of print head 60. Therefore, as print head 60 passes over the support substrate 20, the portions of ink 50, which have become molten, transfer from the support substrate 20 into the receiving article 45. Print head 60 is typically composed of a matrix of compactly spaced, tiny, heated dot elements. The transferred ink 50 has about the same size and shape as the corresponding heated dot elements of the print head. Alternatively, thermal print head 60 may be composed of a heating element of a desired shape and size rather than the heated element containing tiny dot elements.

For example, print head 60 may be composed of electrically activated heating elements 65 of elongated, narrow design to enable transfer of ink 50 in the shape of lines of varying width, advantageously under ¼ inch in width to produce a bar code print image. Alternatively, the electrically activated heating element 65 may individually take the shape of alphanumeric or other characters, preferably under ¼ inch in height and width, resulting in transfer of ink 50 in size and shape conforming to these characters.

Thermal ink transfer laminate 10 must satisfy a number of requirements simultaneously. The heat sensitive transfer ink 30 must first of all be easily and uniformly coatable onto support substrate 20 at the preferred low coating weights while employing conventional coating equipment. Ink coating 30 must have sufficiently high adhesive bonding strength to permit it to adhere to support substrate 20, but yet must exhibit high release characteristics upon melting so that it is readily releaseable and transferable from support member 20 to receiving article 45. Additionally, the transferred ink 50 must adhere permanently onto the receiving article 45, and importantly must convey a sharply defined image of high reflective optical density. The pigment colorant employed in ink 30 must have the property that it does not fade with time and is highly durable so as to withstand frequent handling. Thus, transferred ink images 50 must solidify as a hard, durable, wear-resistant, highly defined image of high optical density. As taught in the prior art, the ink mix for coating 30 must exhibit a sharp drop in viscosity at its melting point. Thus, the preferred ink mix must have relatively low viscosity when compared with other ink mixes of similar melting points for use in a thermal ink transfer system. Heat sensitive ink formulations, which exhibit relatively low viscosity at their meltin point as reported in the prior art, permit a higher print speed, for example less than 3 microseconds per element pulse duration. However, thermal ink transfer laminates of the type having a low melt viscosity, for example as described in the publication, T. Ohno, M. Mizuguchi et al., supra have the disadvantage that the transfer ink layer 30 does not release cleanly and completely from the support substrate. Since the release is imperfect, microscopic particles of ink are left behind on the support substrate in the region where release occurred. This results in attainment of image clarity and definition less than that possible if the heat sensitive ink coating released completely leaving behind no microscopic particles. Applicant has found that the inclusion of an unsaturated fatty acid-based coloring agent in combination with a particular combination of wax and resin binders produces a hot melt heat sensitive ink formulation (coating 30) which overcomes the prior art problems of incomplete release and inadequately defined transfer images. Applicant has accomplished this result without sacrificing any of the other desirable physical properties that the ink formulation must exhibit. In fact, applicant has determined that the inclusion of the unsaturated fatty acid-based coloring agent contributes very significantly in attaining a sharp drop in melt viscosity of the ink formulation. The colorant has been determined to contribute significantly to attainment of complete release of the image from the carrier support resulting in improved print definition of the transferred image.

The above-mentioned properties of the thermal ink transfer laminate of the invention permit its advantageous use in a wide variety of thermal printing applications. Thermal ink transfer laminate 10 has particular application for use in wordprocessors, typewriters, computer and calculator printouts, and cash-dispensing machines. It has important application for use in ticket printing machines, for example in printing admission tickets, airline or railroad tickets, as well as lottery tickets. Since thermal ink transfer recording systems are fast, clean, and require only heat to effect the print transfer, such systems are basically quite economical, reliable and easy to operate and maintain. Problems associated with prior art thermal ink transfer laminates have been in obtaining clearly defined transferred print images of durable quality and high optical density even at high print speeds. Applicant's formulation for coating 30 herein represents an advance over prior art heat transfer laminates in that it permits high print speeds without sacrifice in print definition since the formulation is virtually completely releasable from the support substrate upon contact of a thermal print element to the substrate. The transferred image 50 resulting from applicant's heat sensitive coating 30 is also hard, durable, and fade resistant. An additional advantage of the thermal ink printing laminate 10 of the invention is that it may be applied virtually without regard to the type of material of the receiving article. In particular, it is effectively used in transferring print images onto virtually any type of paper, as well as plastic articles. Since the transferred print image 50 is hard and durable, the transfer laminate of the invention has particular utility in printing paper or plastic items such as cards or articles which will be subjected to frequent handling, such as identification cards or permanent passes. The transferred print image resulting from the ink coating 30 of the present invention has proved to resist abrasion even upon exposure to frequent and prolonged handling.

A preferred support substrate 20 is composed of a thin, heat resistant paper that possesses high surface smoothness. The preferred paper is very thin on the order of about ½ mil and has a high smoothness of about 0–3 on the Sheffield scale of 0–100. The paper density is typically about 1.3 gms./cm$^2$. A high degree of smoothness enhances the release properties of the heat sensitive coating 30. A preferred paper of this type is a capacitor paper of high smoothness of about 0–3 on the Sheffield scale. Substrate 20 may also be a heat resistant plastic film. A particularly suitable plastic film is comprised of polyester or polyester coated with a heat resistant resin. If polyester film is used, its thickness should be less than about 0.5 mil, preferably between about 0.3 to 0.5 mil and should have a smoothness of about 0–3 on a Sheffield scale of 0–100. Polyester film is desirable since it has high surface smoothness, and is heat resistant at the temperatures at which coating 30 is applied to and subsequently transferred from substrate 20. Such temperatures typically span a range from 130°–225° F.

Heat sensitive coating 30 is composed of a hot melt ink mix containing a coloring agent, a wax binder, and a resin binder component. The formulation may optionally include a small amount of plasticizer oil to enhance the fluid and plastic characteristics of the mix. Preferred formulations for the hot melt ink mix are set forth in Table I. It has been determined preferable to formulate the ink mix so that it has a drop melt point in a range between about 130° to 225° F. and a viscosity of about 500 centipoise at 225° F. The viscosity of the ink mix is typically in a range between about 150 to 900 centipoise measured at 225° F. It is preferable that the ink mix exhibit a viscosity low enough at or slightly above the melt point such that the mix is fluid and readily coatable onto support substrate 20 and readily transferable from substrate 20 to receiving article 45 during the transfer printing operation. It is preferable that the ink mix forming heat sensitive coating 30 exhibit a viscosity of between about 150 to 900 centipoise, preferably 150 to 500 centipoise, and desirably 250 to 500 centipoise, at temperatures of about 130° F. to 225° F. The latter temperature range is a preferred range to which coating 30 is heated by employing thermal print element 60. Heating of coating 30 to significantly higher temperatures has the disadvantage of possibly causing scorching or deformation of substrate 20. Lower temperatures tend either to be below the melting point of the ink mix or else do not yield ink mix viscosity low enough to effect good and complete transfer of ink image 50 from support substrate 20.

In addition to having melting point and viscosity within the above-stated preferred ranges, it has been determined that heat sensitive coating 30 have a basis weight preferably between about 2 to 2.5 lbs. per ream (2,000 sq. ft. per ream). A coating weight within this range facilitates complete transfer of image 50 and attainment of highly defined transferred images while preventing occurrence of noticeably raised transfer image surfaces on receiving article 45.

The coloring agent is composed of a dye, preferably a black dye such as nigrosine, dispersed in an unsaturated fatty acid medium, preferaby a monounsaturated fatty acid. Pigments such as carbon black are advantageously also included. Desirable monounsaturated fatty acid mediums may be selected from any of the monounsaturated fatty acids having a carbon content from $C_{10}$ to $C_{20}$ or mixtures thereof. More preferably, monounsaturated fatty acids are selected from those having a carbon content between about $C_{15}$ to $C_{18}$. The preferred monounsaturated fatty acids in this latter group are cis isomers. Particularly desirable cis isomers of $C_{15}$ to $C_{18}$ monounsaturated fatty acids are cis-9-Hexadecanoic acid (palmitoleic acid); cis-11-Hexadecanoic acid; cis-9-octadecenoic acid (oleic acid); and cis-11-octadecanoic acid (asclepic acid).

It has been determined that the above-referenced monounsaturated fatty acid medium, in particular oleic acid, drastically reduces the melt viscosity of the ink mix even when the acid is present therein in amounts as little as 3 wt. percent, typically about 10 wt. percent. It has been determined that inclusion of dye/unsaturated fatty acid colorant, for example a dye/oleic acid-based colorant in an amount of about 10 percent by weight of the ink mix formulation set forth in Table I reduces viscosity of the mix from about 1200 centipoise to about 400 centipoise as measured at about 25° F. above the melting point of the mix. Consequently, there is a sharp drop in viscosity of the mix (heat sensitive coating 30) during formation and transfer of image 50 to a receiving article 45, thus markedly enhancing release and transfer of formed image 50. Additionally, it has been determined that coloring agents having an unsaturated fatty acid-based medium produce a transferred image of higher optical density than would be obtainable if coloring agents without such medium are employed. It has been determined that coloring agent mediums of this type enhance the release characteristics of heat sensitive coating 30 as a thermal print head is applied to substrate 20. Applicant believes that the enhanced release properties accomplish an important objective of the invention, namely complete transfer of image 50 from the substrate at the point of contact of the thermal print head to the substrate. Applicant has determined that the degree of transfer is so complete that virtually no ink particles are visible to the unaided eye on the coated side of substrate 20 in regions on the substrate where transfer has been effected. It is believed that other physical properties of the coloring agent in addition to its ability to drastically lower viscosity of the ink mix may also contribute to the attainment of a complete release of transfer image 50 from the substrate. Suitable unsaturated fatty acid mediums may be selected from mono or polyunsaturated fatty acids having a carbon content from about $C_{10}$ to $C_{20}$; a preferred group of unsaturated fatty acids are those having a carbon content between about $C_{15}$ to $C_{18}$, and typically within this group a monounsaturated fatty acid such as oleic acid or ricinoleic acid, a diunsaturated fatty acid such as linoleic or a triunsaturated acid such as linolenic acid may be present. Simultaneously with the attainment of markedly improved release properties, the unsaturated fatty acid-based coloring agent has been determined to significantly improve permeation of the transferred image 50 into the surface of a paper receiving article 45. Enhanced permeation attained results in improved anchorage, i.e. improved adhesion of the transferred image on the surface of a paper receiving article 45. This also results in a transferred image which is not raised but rather is level with the surface of receiving paper 45. Thus, transferred image 50 being strongly anchored to and level with the receiving surface will withstand rubbing or handling far better than conventional thermal inks which do not use unsaturated fatty acid-based coloring agents within the formulation of the present invention.

Suitable dyes which may be dispersed in the unsaturated fatty acid-based medium may be selected from a wide array of conventional black or colored dyes. If a black colorant is desired, the dye may be advantageously selected from methyl violet, nigrosine, or induline dyes or any combination thereof. Nigrosine dye or derivatives thereof are preferred black dyes to be used in the unsaturated fatty acid-based medium to produce a black pigmented coloring agent. In such black coloring agents it has been found to be advantageous to include carbon black. A blend of nigrosine dye dispersed in an oleic acid medium is a particularly suitable black coloring agent for the present invention. This blend is available under the tradename BLACK PASTE 9744 from the Paul Uhlick Co. of Hasting or Hudson, New York. Applicant has also determined that although the oleic acid-based coloring agent such as BLACK PASTE 9744 may be employed alone, it is more advantageous to combine such coloring agent with carbon black, typically in about a 50/50 weight ratio of BLACK PASTE 9744 to carbon black. Suitable carbon black is available from a number of sources. A preferred grade of carbon black is available under the tradename MONARCH 1300 available from the Cabot Corporation of Billerica, MA.

Alternatively, colored dyes may be dispersed in the unsaturated fatty acid medium to produce a coloring agent having any desired color, tint or hue. Essentially any colored dye which may be dispersed or solubilized in unsaturated fatty acid may be employed. These pigments are conveniently selected from the primary colors red, yellow, and blue and mixed in proportions which yield the desired color tone. Preferred yellow, red, and blue dyes for use in the unsaturated fatty acid medium are available respectively under the trade designation BASO TM YELLOW 124, BASO TM RED NB 546 and BASO TM BLUE 645. The dyes may be blended to obtain any desired color. These dyes may be used with any of the unsaturated fatty acids but are particularly soluble in oleic acid and therefore advantageously used therein.

The wax binder component is principally composed of a paraffin wax and a microcrystalline wax. The wax binder preferably includes a hard wax such as Carnauba wax as well. The paraffin wax has a lower melting and softening point than the microcrystalline or Carnauba wax, and the paraffin together with the coloring agent has been determined to give the ink coating its principal fluidity and release characteristics on melting. Paraffin wax, which is a petroleum-derived product, typically has a molecular weight between about 254 to 450 and is composed essentially of linear, saturated hydrocarbons ranging from $C_{18}H_{38}$ to $C_{32}H_{66}$. Paraffin waxes typically have a melting point from about 110° to about 175° F. (Melting point as referred to herein is the drop melting point.) A preferred paraffin wax for use in the hot melt ink mix for coating 30 of the present invention is composed of linear saturated hydrocarbons having a melting point between about 150° to 160° F.

The microcrystalline component of the ink mix is composed of saturated hydrocarbons of higher melting point than those of paraffin wax. Microcrystalline waxes characteristically contain between about $C_{34}H_{70}$ to $C_{60}H_{120}$ hydrocarbons having molecular weights between about 478 and 840. Microcrystalline waxes (micro-waxes) are characterized by an increased amount of branching; although they contain straight chain molecules they are not as linear a saturated hydrocarbon as paraffin wax. Microcrystalline wax also is less crystalline than paraffin wax and contains predominantly malcrystalline and needle-like crystals having very small undefined form as compared with the well-defined, plate-like crystalline structure of paraffin wax when viewed under the same magnification with electron transmission microscopes. The micro-waxes have a higher melting point than paraffin wax, and a more sharply defined softening and melting range than paraffin. Although micro-waxes have higher softening and melting points, the viscosity of micro-wax melt is only slightly higher than that of molten paraffin wax. The higher melting point of micro-wax imparts a degree of hardness and durability to the paraffin wax, which make ink coating 30 and transferred images 50 less prone to smudging. Since micro-wax does not significantly increase the melt viscosity of the mix, it does not significantly interfere with attainment of desired low melt viscosity for the ink mix. Also, the micro-wax imparts a degree of plasticity to the paraffin wax. Thus, the microcrystalline component prevents the ink coating 30 from developing cracks or fissures which might otherwise occur over a prolonged period, particularly if the ink image is transferred onto a plastic-receiving article instead of paper. Microcrystalline wax is commercially available under various classes which depend principally on their melting point. The principal classes of microcrystalline waxes are hard micor-waxes having a melting point between about 190°–210° F.; plastic micro-waxes having a melting point between about 145°–175° F.; emulsifiable crystalline waxes between about 190°–225° F.; and modified micro-waxes between about 165°–220° F. These principal classes of microcrystalline wax may be employed within the ink coating formulation of the present invention. A particularly suitable grade, however, is selected from the plastic-type of microcrystalline wax (BARECO designation). A commercially available microcrystalline wax is available under the tradename VICTORY WHITE available from the Bolar Petroleum Company of Wayne, Pa. A preferred paraffin wax for use in the heat sensitvie ink formulation is commercially available, illustratively, under the tradename 1435 PARAFFIN WAX from the Boler Petroleum Company.

The Carnauba wax component of the wax binder is a hard wax, which has a higher melting point than the paraffin wax component, and its inclusion in the ink formulation mix gives the mix enhanced body and is even more effective than micro-wax in increasing the hardness and toughness of the ink coating on substrate 20 and transferred ink image 50 on receiving article 45. However, since Carnauba wax increases the melting point and melt viscosity of the ink mix more significantly than the same amount of micro-wax, the Carnauba wax should preferably be present in the ink mix in smaller quantity than micro-wax. Carnauba wax should preferably not be added in amounts which would raise the drop melt point of the ink mix higher than about 170° F. Carnauba wax is available under a number of grades and is commercially available from a number of sources. The preferred Carnauba wax is available commercially under the tradename #3 GRADE from the Frank B. Ross Co. of Jersey City, N.J. Montan wax is a hard wax, which may be modified to have similar properties as Carnauba wax and therefore is a suitable substitute.

In addition to the wax binder component, a resin binder is also included in the ink mix of the present invention. The resin binder must have a melt point in a range which permits attainment of the desired melt point of the ink mix, preferably within a range between about 130° F.–225° F. The resin component of the binder is added principally to increase the durability and abrasion resistance of the transferred image 50 on receiving article 45. If the binder is composed entirely of wax components, then the transferred image tends to have a softer consistency on solidification, and therefore would be more prone to smudging or abrasion during frequent handling. The resin binder component, however, cannot be added in too great an amount otherwise it would interfere adversely with the release characteristic of the heat sensitive coating 30. Also, if too much resin is included, the ink mix becomes very difficult to coat onto substrate 20 with conventional coating methods. Thus, a balance must be achieved between a desire for increased fluidity and release characteristics of coating 30 with that of increased durability and abrasion resistant properties of the transferred image 50. In order to accomplish these objectives, applicant has determined that a resin such as a polyethylene-based resin, such as polyethylene granules or a copolymer of ethylene and vinyl acetate is particularly suitable. A resin of this latter type is available under the tradename ELVAX 410 from E. I. DuPont de Nemours and and Co. ELVAX binder is preferred when it is desired to enhance gloss of the transferred image 50. Applicant has determined that the resin should advantageously comprise between about 5 to 25 percent by weight of the total wax plus resin binder components, and preferably the resin component comprises about 15.6 percent by weight of the total ink mix. The weight ratio of resin binder components to paraffin wax should be between about 0.5/1.0 to 0.17/1.0, preferably about 0.25/1.0.

Applicant has determined that in a preferred formulation for the ink mix forming coating layer 30, the paraffin wax component is preferably between about 25 to 75 wt. percent of the wax binder. The weight ratio of paraffin wax to microwax is preferably between about 1.5 to 3.5. Carnauba wax is preferably present in the wax binder in an amount which is less than about 10 percent by weight, typically about 7.2 percent by weight. The total amount of coloring agent in the ink mix comprises about 5 to 40 percent by weight, typically about 20 percent by weight of the entire formulation. The total amount of binder which includes wax and resin components therefore comprises essentially all the balance of the formulation with the optional inclusion of a small amount of plasticizer oil, which normally would comprise less than about 1 percent by weight of the entire formulation. Applicant has found it desirable to include such oil to increase the fluid characteristics of the coating at its melting point to facilitate coating of the ink mix onto substrate 20 using conventional coaters. A suitable plasticizer oil of the octyl tallate type is available under the trade designation PLASTHALL R-9 oil available from CP Hall Company of Chicago, Ill.

Preferred compositions for ink coating 30 are shown in Table I. Formulation A and Formulation B of Table I are identical except that in place of the ELVAX resin in Formulation A a polyethylene resin has been substituted. The substituted resin which appears in Formulation B is available under the tradename AC617 POLYETHYLENE GRANULAR PARTICLES from E. I. DuPont and Co.

TABLE I

| Heat Sensitive Ink Formulation: | Formulation A Wt. Percent | Formulation B Wt. Percent |
|---|---|---|
| Coloring Agent | | |
| Dye/Unsaturated Fatty Acid-Based Medium (e.g. BLACK PASTE 9744) | 10.3 | 10.3 |
| Carbon Black (e.g. MONARCH 1300) | 10.3 | 10.3 |
| Wax Binder | | |
| Paraffin Wax (e.g. 1435 Paraffin Wax from Boler Wax Co.) | 40.4 | 40.4 |
| Microcrystalline Wax (e.g. VICTORY WHITE) | 15.5 | 15.5 |
| Carnauba Wax (e.g. No. 3 Grade from Charles Ross Co.) | 7.2 | 7.2 |
| Resin Binder | | |
| Resin (e.g. ELVAX 410) | 15.5 | |
| (e.g. polyethylene granular particles from A0-617) | | 15.5 |
| Plasticizer Oil | | |
| Octyl Tallate (PLASTHALL R-9) | 0.8 | 0.8 |
| | 100.0 | 100.0 |

Figure 2A:
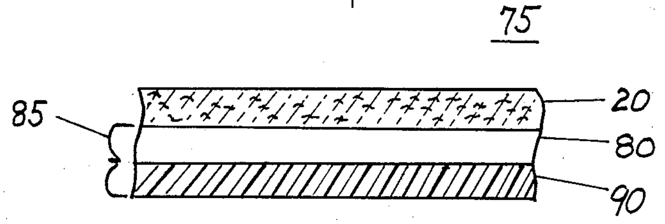
FIG. 2A is an illustration of another embodiment of a thermal ink transfer laminate.
Figure 2B:
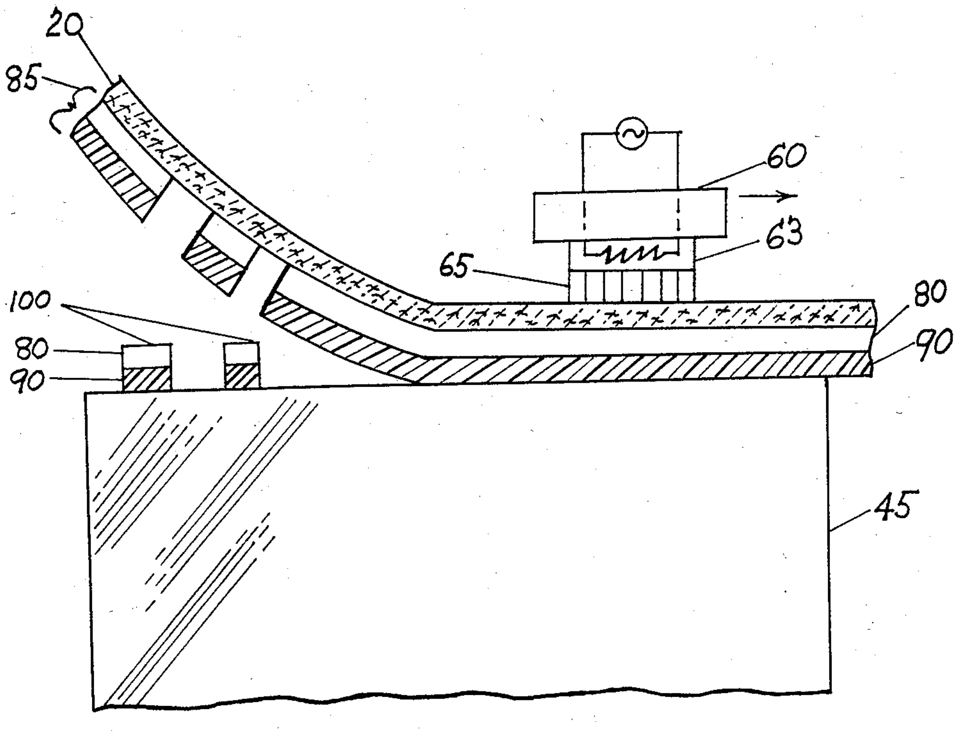
FIG. 2B is an illustration of the transfer laminate shown in FIG. 2A as applied to a receiving article.

An alternate embodiment is shown in FIGS. 2A and 2B. In this embodiment the thermal ink transfer laminate 75 is composed of a support substrate 20 which is overcoated with a separate release layer 80 and a transfer ink coating 90 coated onto the release layer. The release layer 80 and transfer ink coating 90 form the heat sensitive transfer substrate 85 which is transferred onto a receiving article as print head 60 impacts the exposed side of support substrate 20. As previously discussed, print head 60 is typically composed of a matrix 63 of compactly spaced, tiny metal probes 65 (dot elements under 1/16 inch in diameter) which are electrically activated. As individual dot elements become electrically activated they become hot instantly. As print head 60 is pressed onto the exposed side of support substrate 20, a tiny portion of release layer 80 corresponding in width to the heated dot element of print head 60 will melt and a corresponding tiny portion of the heat sensitive transfer substrate 85 will release from support substrate 20 and transfer onto receiving article 45 as thermal ink transfer laminate 75 contacts the receiving article 45. Alternatively, print head 60 may be composed of electrically activated heating elements 65 of elongated, narrow design to enable transfer of transfer substrate 85 in the shape of lines of varying widths, preferably under ¼ inch and typically under ⅛ inch in width, to produce a bar code print image. The electrically activated heating element 65 may individually take the shape of alphanumeric or other design characters, advantageously under ½ inch in height and width, resulting in transferred ink images 100 of size and shape conforming to these characters. Essentially all of the release layer 80 at the precise point of contact corresponding to impact width of any heated element of print head 60 will transfer from support substrate 20. Thus, the transferred ink image 100 will be composed of discrete portions of transfer ink coating 90 in contact with receiving article 45 and an overcoat portion thereon which is the transferred release layer 80 as best illustrated in FIG. 2B.

In this embodiment of the invention, the transferred release coat 80 over transferred ink image 100 provides a protective layer over each discrete portion of transferred ink coating 90 which gives the transferred image 100 greater protection against scuffing or smudging. The embodiment shown in FIG. 2B has an advantage over that shown in FIG. 1 inasmuch as it is easier to employ multiple colors in the transfer ink coating 90 when employing a separate release layer 80. This is because the ink coating 90 employed in the FIG. 2 embodiment is not a hot melt coating but rather is a solvent-based coating which can be more readily applied using gravure coating techniques. It is much easier to apply ink coating 90 having multiple colors by using multiple gravure printing stations in series to print the various colored inks onto support substrate 20. In contrast, the ink transfer coating 30 in the FIG. 1 embodiment is a hot melt coating. Transfer coating 30 is preferably applied using conventional hot melt coaters such as roller-type coaters wherein it is more difficult to apply multiple color inks to form a multicolored pattern. Since the gravure technique is as suitable for coating hot melt compositions it becomes more difficult to utilize the FIG. 1 embodiment when the ink coating layer 30 is intended to contain a multiplicity of colors.

Release layer 80 is a wax-based release composition containing a wax binder and ream binder. The wax binder is preferably composed of a paraffin wax, a microcrystalline wax, and carnauba wax. All of the foregoing discussion concerning suitable types and molecular formulations and subspecies of paraffin wax, microcrystalline wax, and carnauba wax which have been discussed with respect to the formulation for ink transfer layer 30 of FIG. 1 is equally applicable to use in release layer 80. Similarly, the discussion concerning suitable resin binder, preferably ethylene vinyl acetate copolymer, made with reference to the transfer ink coating 30 of FIG. 1 is equally applicable to use of this binder in the release layer 80 formulation.

Thus, the preferred paraffin wax, microcrystalline wax, carnauba wax and resin binder employed in release layer 80 are also the same as the corresponding preferred paraffin wax, microcrystalline wax, carnauba wax and resin binder respectively which are employed in ink transfer coating 30 of FIG. 1. Specifically, the preferred paraffin wax for release layer 80 is available under the trade designation 1435 Paraffin Wax from the Boler Wax Company. A preferred microcrystalline wax is available under the trade designation VICTORY WHITE from the Boler Wax Company, and a preferred carnauba wax is available under the designation No. 3 Grade from Charles Ross Company. The resin binder employed in release layer 80 is preferably ethylene vinyl acetate copolymer available under the trade name ELVAX 410 from E. I. DuPont Company. A preferred formulation for the release layer 80 is illustrated in Table II.

Ink transfer coating 90 utilized in the embodiment shown in FIG. 2B is preferably a solvent-based ink which preferably contains a coloring agent, a resin binder and plasticizer oil. The coloring agent preferably contains a dye or pigment dispersed in an unsaturated fatty acid based medium (dye/unsaturated fatty acid medium). The discussion in the foregoing concerning suitable and preferred chemical classes and most preferred chemical species which could constitute the unsaturated fatty acid based medium included in transfer layer 30 of FIG. 1 is equally applicable for the ink transfer coating 90 of the FIG. 2 embodiment. Also, the dye component in the coloring agent in coating 90 may be selected from a wide array of conventional black or colored dyes as previously discussed. Thus if black colorant is desired, the dye may advantageously be methyl violet, nigrosine, or induline dyes or combinations thereof. In such black coloring agent it is advantageous to include carbon black. A preferred dye/unsaturated fatty acid-based medium for use in ink transfer coating 90 is available under the trade designation BLACK PASTE 9744 from Paul Uhlick Company of Hasting on Hudson, N.Y. Similarly, the carbon black component may conveniently be obtained under the trade designation MONARCH 1300 available from the Cabot Corporation of Billerica, Massachusetts. A preferred plasticizer oil is octyl tallate available under the trade designation PLASTHALL R-9 from C. P. Hall Company of Chicago, Illinois. The resin binder in the transfer ink is preferably composed of a polyterpene hydrocarbon resin. For the purposes of the present specification, the polyterpene class may be construed broadly to include any polymer of terpene or any copolymer with at least one of the monomers as a terpene hydrocarbon. The terpene class shall include all hydrocarbons based on the isoprene unit $C_5H_8$ and having the general formula $(C_5H_8)_n$ (isoprene compounds) and may be either a acyclic or cyclic with one or more benzenoid groups. A preferred polyterpene hydrocarbon resin is available under the trade designation PICCOLYTE S-85 Resin available from the Hercules Chemical Corporation.

Ink coating 90 may contain color dyes instead of the black pigment. In such cases, color dye may be dispersed in the unsaturated fatty acid-based medium to produce a coloring agent having the desired color, tint, or hue. Essentially any color dye which may disperse or solubilize in the unsaturated fatty acid medium may be employed. These pigments are conveniently selected from the primary colors red, yellow, and blue and mixed in proportions which yield the desired color tone. Preferred yellow, red, and blue dyes for use in the unsaturated fatty acid medium are available respectively under the trade designation BASO TM YELLOW 124, BASO TM RED NB 546, and BASO TM BLUE 645. The dyes may be blended to obtain any desired color. These dyes may be used with any of the unsaturated fatty acids but are particularly soluble in oleic acid and therefore advantageously used therein. A preferred formulation for transfer ink coating 90 employed in FIG. 2 is illustrated in Table II.

TABLE II

| Transfer Ink Coating (90): | Wt. % (Wet) | Wt. % (After Drying) |
|---|---|---|
| Coloring Agent: | | |
| Dye/Unsaturated Fatty Acid-Based Medium (e.g. Black Paste 9744) | 9.0 | 22.5 |
| Carbon Black (e.g. MONARCH 1300) | 13.5 | 33.8 |
| Resin Binder II: | | |
| Polyterpene Hydrocarbon Resin (e.g. Piccolyte S-85 Resin) | 16.8 | 42.0 |
| Plasticizer Oil: | | |
| Octyl Tallate (e.g. Plasthall R-9) | 0.70 | 1.7 |
| Solvent: | | |
| Toluene | 60.0 | 0.0 |
| | 100.0 | 100.0 |

TABLE II-continued

| Release Layer 80: | Wt. % |
|---|---|
| Wax Binder: | |
| Paraffin Wax (e.g. 1435 Paraffin Wax from Boler Wax Co.) | 51.4 |
| Microcrystalline Wax (e.g. Victory White) | 19.7 |
| Carnauba Wax (e.g. No. 3 Grade from Charles Ross Co.) | 9.2 |
| Resin Binder: | |
| (e.g. Ethylene Vinyl Acetate copolymer ELVAX 410) | 19.7 |
| | 100.0 |

The ink mix formulation (heat sensitive coating 30) may be prepared in accordance with the composition set forth in Table I for either Formulation A or B in the following manner for use in commercial scale production.

A mix is prepared simply by adding the components in the proportions shown in Table I for either Formulation A or Formulation B to a mixing vessel. There is no need for premixing of the components, and therefore they may be all added to the vessel at the same time. The vessel is heated by any convenient means, typically by steam jacket, up to at least the melting point of the mix, preferably slightly in excess of the drop melting point, characteristically a temperature up to about 200° F. After all the components are added, the vessel is closed and the mix blended and milled through the aid of stainless steel milling balls, typically of about ⅜" diameter present in the vessel. As the vessel is tumbled, the milling balls disperse the carbon black and coloring agent until a homogeneous mixture of predetermined dispersion is obtained. It has been determined to be desirable to mill the mix for a period of time until a dispersion of at least 4, as measured on the Hegman scale of 0 to 10 is obtained. The vessel temperature is maintained throughout the milling process at a temperature which is at least as high as the melting point of the mix. Small scale laboratory batches of ink mix, for example on the order of 300 gms. per batch, may be prepared in similar manner except that a closed vessel need not be employed. Instead, the wax and resin binder components are added to a small, open vessel in accordance with the formulation set forth in Table I for either Formulation A or B. The mix is then heated in any desirable manner by direct or indirect heating until it becomes totally liquid at its melting temperature. At that point, the coloring agent and remaining components are added and the mixture then stirred until homogeneous consistency is obtained. The stirring may be affected by simple hand-stirring for sufficient time to obtain a homogeneous blend. At that time, a milling media, which may be composed of ⅜" stainless steel balls, is added to the vessel, and the vessel then placed in between two rotating, horizontal cylinders which comprise a rolling mill. The vessel is placed in an oven operating above the melting point of the mix. The cylinders may be made to rotate in opposite directions thus permitting the milling balls therein to form a homogeneous dispersion of the coloring and all components in the blend. Milling is achieved in this manner until the dispersion registers at least a 4 on the Hegman scale.

After the homogeneous dispersion is prepared in either manner as above-described, the melt may then be immediately coated directly onto substrate 20. Alternatively, the mix may be stored for an indefinite period of time at ambient temperature, and at any time thereafter reheated to above its melting point and then coated onto substrate 20. (It has been determined that the properties of the ink mix will not deteriorate upon storage for an indefinite period of time at ambient temperature). For commercial scale production it is preferable to apply the ink mix to substrate 20 by gravure method. Conventional cast-coating techniques may also be employed for commercial scale coating of the ink mix onto substrate 20. One such method may simply be to employ a conventional coating applicator roller, which may be either stainless steel or a rubber cylinder, to coat the ink mix onto the substrate and then pass the coated substrate through a metering roller. The metering roller may be a wire wound rod, which removes excess ink from the substrate and allows attainment of the required coating weight. The amount of ink excess removed can be controlled by the thickness and spacing of the wire used in the wire wound metering rod. After passage through the metering roller, the coated substrate may then be subjected to a chill roller to harden the coating on the substrate. The foregoing coating techniques are intended to be merely illustrative of suitable coating methods, and it should be appreciated that other coating methods would become apparent to those skilled in the art and may be equally suitable.

In formulating release layer 80 in Table II, a mix in the proportions shown in Table I is prepared within a mixing vessel. The vessel is heated by any convenient means, typically be steam jacket up to at least the melting point of the mix, preferably slightly in excess of the drop melting point, characteristically a temperature up to about 200° F. The mix may be blended by stirring until homogeneous mixture is obtained. The mix is heated to a temperature above its melting point forming a hot melt which is readily applied by use of conventional applicator roller with wire wound metering rod to form a uniform coating on substrate 20. Release layer 80 is coated onto support substrate 20 to a basis weight of about one pound per ream (17,000 sq. ft. per ream).

Release coat 80 is cooled preferably by subjecting it to chill rollers whereupon it forms a hardened solid coating on support 20. Transfer ink coating 90 is then applied over release coat 80. The transfer ink coating 90 formulation as shown in Table II may be prepared readily by simply blending the various components in the proportions shown in Table II in conventional mixing vessels. There is no need for premixing the components forming the ink coating 90 and therefore they may be all added to the vessel at the same time. After all the components are added, the vessel is closed and the mix blended and milled with the aid of stainless steel mixing balls, typically of about ⅜" diameter present in the vessel. As the vessel is tumbled, the milling balls disperse the carbon and coloring agents until a homogeneous mixture of predetermined dispersion is obtained. It is determined to be desirable to mill the mix for a period of time until a dispersion of at least 4 as measured on the Hegman scale of 1 to 10 is obtained. When a homogeneous mixture is obtained, the transfer ink coating 90 may be coated directly onto release layer 80 by employing conventional gravure coating techniques. Transfer ink coating 90 is coated to a basis weight of about 1 lb./ream (17,000 sq. ft./ream) and this coating is then subjected to convective drying to evaporate solvent therein. (The combined basis weight of release layer and transfer ink coating (wet) may desirably be between about 1.8 to 2.3 lbs./ream (17,000 sq. ft. per ream).

The invention has been described within the context of preferred embodiments for the thermal ink transfer laminate. It is known that thermal ink transfer laminates may contain other coating layers, for example there may be a heat sensitive coating layer on both sides of the substrate instead of just one side. The additional heat sensitive ink layer could be of the same or similar composition as that described in the present invention, and it may or may not be transferable. If it is not transferable, it may be utilized for the purpose of forming a duplicate image on the substrate which may then serve as a carbon copy of the image that has been transferred. The invention is thus equally applicable to such varying embodiments which may employ additional coatings and incorporate the heat sensitive ink coating described herein. The invention therefore is not intended to be limited to the description in the specification, but rather is defined by the claims and equivalents thereof.

I claim:

1. An improved thermal ink transfer laminate of the type comprising:

a heat transferable laminate on a thermally conductive support member, said support member comprising material selected from the group consisting of paper and plastic film for transfer of images formed on said heat transferable laminate by contact of an electrically-activated heat generating printing element to a side of the support opposite said heat transferable laminate, said support member essentially not electrically conductive, said formed images transferred to a receiving article in contact with the heat transferable laminate, wherein the improvement comprises a heat transferable laminate comprising:

a wax-based release layer in contact with the support member and a transfer ink coating over the release layer, the ink coating comprising a coloring agent and a resin binder, said coloring agent comprising a dye dispersed in an unsaturated fatty acid having a carbon content between about $C_{10}$ to $C_{20}$, said coloring agent effecting a sharp drop in the melt viscosity of the heat transferable laminate during transfer of said formed images to the receiving article.

2. A thermal ink transfer laminate as in claim 1 wherein the unsaturated fatty acid is a polyunsaturated fatty acid.

3. The thermal ink transfer laminate as in claim 1 wherein the dye is selected from the group consisting of nigrosine, methyl violet, and induline dye.

4. A thermal ink transfer laminate as in claim 1 wherein the coloring agent further comprises carbon black.

5. A thermal ink transfer laminate as in claim 1 wherein the resin binder comprises a polyterpene hydrocarbon resin.

6. A thermal ink transfer laminate as in claim 1 wherein the release layer comprises a wax binder and resin binder said wax binder comprising paraffin wax, microcrystalline wax, and carnauba wax.

7. A thermal ink transfer laminate as in claim 1 wherein the release layer has a drop melting point between shown 130° F. to 225° F.

8. A thermal ink transfer laminate as in claim 1 wherein a mixture of the total components comprising the heat transferable laminate has a viscosity of between about 150 centipoise to 900 centipoise at a temperature of 225° F.

9. A thermal ink transfer laminate as in claim 1 wherein the thermally conductive support is a thin paper sheet of high smoothness measuring between about 0 to 3 on the Sheffield scale of 0 to 100.

10. A thermal ink transfer laminate as in claim 10 wherein the unsaturated fatty acid has a carbon content between about $C_{15}$ to $C_{18}$.

11. A thermal ink transfer laminate as in claim 10 wherein the unsaturated fatty acid is a $C_{18}$ unsaturated fatty acid.

12. A thermal ink transfer laminate as in claim 10 wherein the unsaturated fatty acid is a monounsaturated fatty acid.

13. A thermal ink transfer laminate as in claim 12 wherein the unsaturated fatty acid is a cis isomer of a monounsaturated fatty acid.

14. A thermal ink transfer system comprising:

a heat transferable laminate on a thermally conductive support member, said support member comprising material selected from the group consisting of paper and plastic film, said support member essentially not electrically conductive, the heat transferable laminate comprising a wax-based release layer in contact with the support member and a transfer ink coating over the release layer; and an electrically activated heat generating printing head comprised of discrete heat generating elements having at least one of the height and width of said discrete elements under about ¼ inch, wherein images are formed on the heat transferable laminate in conformance to the shape and size of said discrete heat generating elements and said formed images transferred to a receiving article in contact with the heat transferable laminate.

15. A thermal ink transfer system as in claim 14 wherein the release layer comprises a wax binder and a resin binder, the wax binder comprises a paraffin wax, a microcrystalline wax, and carnauba wax.

16. A thermal ink transfer system as in claim 14 wherein the transfer ink coating comprises a coloring agent and resin binder, said coloring agent comprising a dye dispersed in an unsaturated fatty acid having a carbon content between about $C_{10}$ to $C_{20}$, said coloring agent effecting a sharp drop in the melt viscosity of the heat transferable laminate during transfer of said formed images to the receiving article.

17. A thermal ink transfer system as in claim 14 wherein the release layer has a drop melting point between about 130° F. to 225° F.

18. A thermal ink transfer system as in claim 14 wherein the thermally conductive support is a thin paper sheet of high smoothness measuring between about 0 to 3 on the Sheffield scale of 0 to 100.

19. A thermal ink transfer system as in claim 14 wherein the discrete heat generating elements have protruding tips of diameter under about 1/16 inch.

20. A thermal ink transfer system as in claim 14 wherein the discrete heat generating elements are in the shape of alphanumeric or design characters of height and width both under about ¼ inch.

* * * * *